May 4, 1965  T. J. SLINGLUFF  3,181,277
ELECTRICAL DUCTS WITH ACCESS CUPS
Filed Sept. 5, 1962
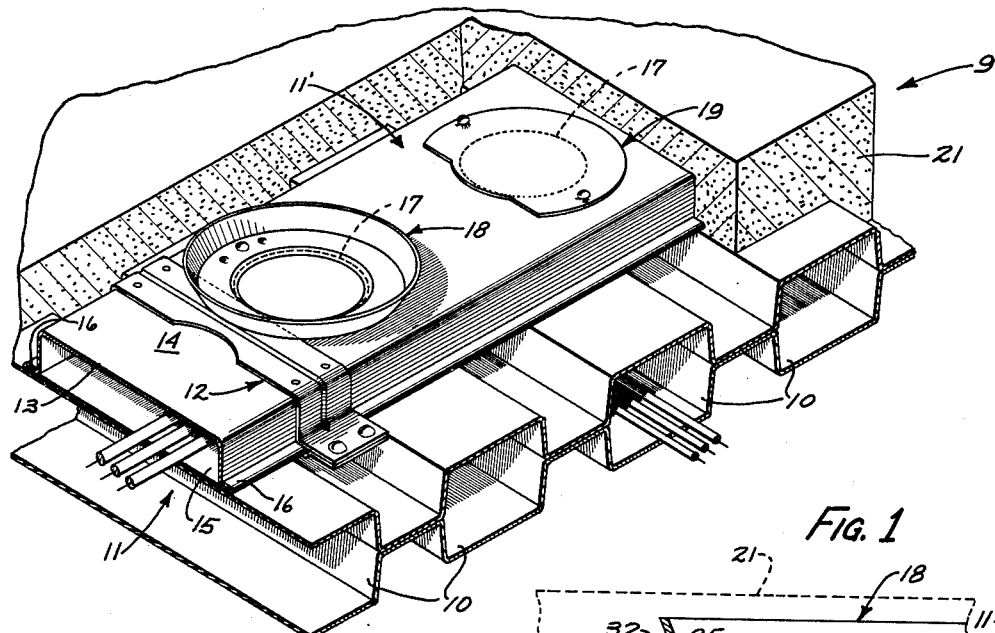
FIG. 1
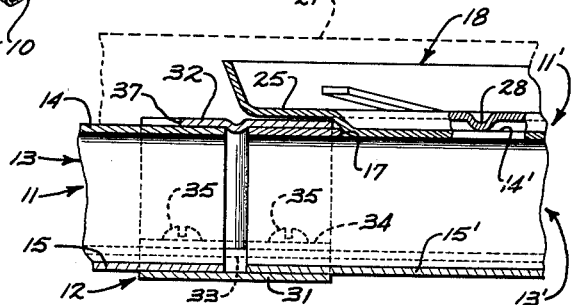
FIG. 4
FIG. 5
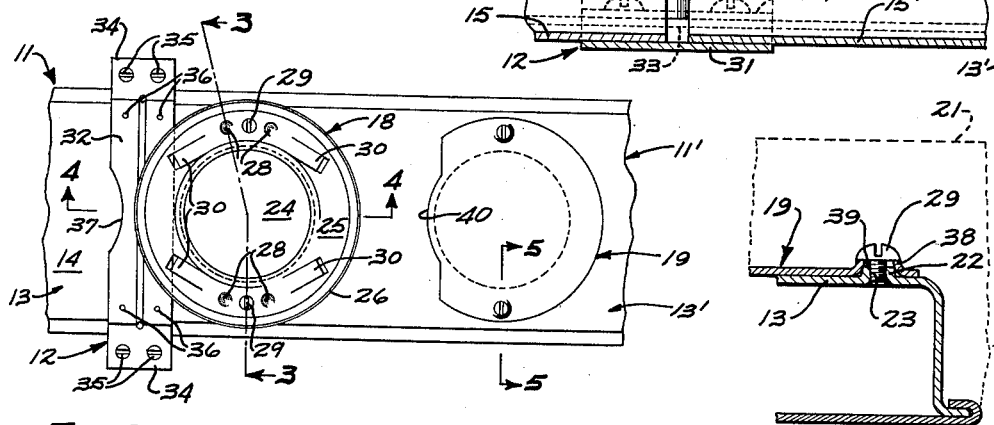
FIG. 2
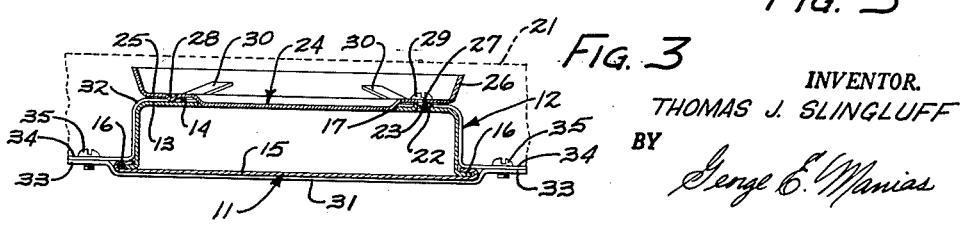
FIG. 3
INVENTOR.
THOMAS J. SLINGLUFF
BY
*George E. Manias*
AGENT

United States Patent Office 3,181,277
Patented May 4, 1965

3,181,277
ELECTRICAL DUCTS WITH ACCESS CUPS
Thomas J. Slingluff, Baden, Pa., assignor to H. H. Robertson Company, Pittsburgh, Pa., a corporation of Pennsylvania
Filed Sept. 5, 1962, Ser. No. 221,509
2 Claims. (Cl. 50—127)

This invention relates to cross-over electrical ducts with access cups, especially cross-over ducts adapted for use in building structures in combination with cellular electrical service flooring.

This invention is a continuation-in-part of my copending application Serial Number 846,659, filed October 15, 1959 now Patent No. 3,093,933 and assigned to the assignee of the present invention.

For many years cellular flooring has been employed in building construction to provide versatility in electrical service. Cellular flooring comprises a plurality of metallic parallel enclosed channels which are supported by beams and girders in a building frame. Concrete or other suitable aggregate floor covering is poured on top of the cellular flooring to form the floors in the resulting building. The enclosed metal cells, beneath the floor covering, remain available throughout the life of the building as passageways for electrical wiring. In order to introduce wiring into a selected flooring cell or to transfer wiring from one selected flooring cell to another selected flooring cell, cross-over ducts are provided which extend transversely of the flooring cells in contact with the outer horizontal surface thereof. Means are provided for opening the cross-over ducts at any time during the life of the building to permit access into the ducts or through the ducts to any selected flooring cell.

Because the cross-over ducts and the flooring cells are destined to serve as passageways for electrical conductors having external insulation coatings, there has been a requirement through the years that the ducts and flooring cells be maintained free of obstructions which might rupture or damage the insulation coating as the electrical conductors are drawn through the ducts and flooring cells. Heretofore, in order to maintain the ducts free of obstructions, the fabrication of the ducts and installation of fittings has been relatively expensive. At the present time external mounting brackets are provided on the flanges of electrical cross-over ducts to support various electrical fittings as shown in U.S. Patent 2,445,197. Alternatively rivets and grommets have been used to fasten the necessary fittings to the electrical cross-over ducts as shown in U.S. Patent 2,824,578.

According to the present invention I have provided electrical cross-over ducts with access cups which are inexpensive to fabricate, easy to assemble, and meet the unobstructed passageway requirement of such structures. Specifically the present invention requires for access cups no external mounting brackets, no rivets, and no fastening grommets.

Instead, access cups may be attached to the present cross-over electrical ducts by means of screws driven externally into the cross-over electrical ducts. The cross-over electrical ducts are provided with a convex external dimple, each having a central threaded opening to receive a screw. All of the access cups have geometrically congruent openings through which a fastening screw extends into the threaded opening in the dimples of the electrical cross-over ducts. The threaded shaft end of each fastening screw remains entirely within the internal volume of the dimple and thus does not penetrate into the cross-section of the duct through which electrical conductors may extend.

The present access cup covers a circular opening cut in the cross-over electrical duct and prevents the ingress of the concrete which is subsequently poured thereover. The present access cup serves as a convenient means for gaining access through the concrete into the cross-over electrical duct.

The circular opening in the cross-over electrical duct instead may be covered by means of a blind flange. However, the present access cup has certain advantages over the blind flange which will be described later.

The invention will be more fully described by reference to the accompanying drawings in which:

FIGURE 1 is a perspective illustration of a typical floor structure employing cellular flooring and electrical cross-over ducts;

FIGURE 2 is a plan view of a pair of axially aligned electrical cross-over ducts having a dish shaped access cup, a blind flange and a coupling for connecting the cross-over ducts;

FIGURE 3 is a cross-section view taken along the line 3—3 of FIGURE 2 showing a cross-over electrical duct and a dish shaped access cup;

FIGURE 4 is a cross-section view taken along the line 4—4 of FIGURE 2 further illustrating the axially aligned electrical cross-over ducts, the coupling and a portion of the dish shaped access cup; and FIGURE 5 is a cross-section view taken along the line 5—5 of FIGURE 2 further illustrating the cross-over duct and the blind flange.

Referring to FIGURE 1, there is illustrated a typical building floor installation including cellular flooring 9 which may include electrical carrying cells 10. A pair of axially aligned cross-over electrical ducts 11, 11′ according to this invention extend transversely of the cells 10 in the cellular flooring 9. The axially aligned cross-over electrical ducts 11, 11′ have their ends connected by means of a coupling 12. The coupling 12 also serves as an electrical grounding connection for the ducts 11, 11′. The cross-over electrical ducts 11, 11′ includes a U-shaped channel 13 having an exposed surface 14 and a flat sheet 15. Flanges 16 are provided along each side of the ducts 11, 11′ to secure the two elements 13 and 15 into an assembled structure. Usually the flat sheet 15 is placed in contact with cellular flooring and the U-shaped channel 13 is exposed.

Circular openings 17 are provided at spaced points along the exposed surface 14 of the U-shaped channel 13 corresponding to the spacing of the electrical carrying cells 10. The circular openings 17 preferably are covered by means of a dish shaped access cup 18. As hereinbefore stated, a blind flange 19 instead may be used to cover the circular opening 17.

In completing construction of the building, a layer 21 of concrete or similar aggregate flooring material is poured on top of the cellular flooring 9 and cross-over electrical ducts 11, 11′.

Openings, not shown in FIGURE 1, are cut into the flat sheet 15 and the upper surface of that subjacent electrical flooring cell 11 which is beneath the circular opening 17. The communication thus provided between the cross-over electrical ducts 11, 11′ and the subjacent electrical flooring permits cell extension of electrical conductors therethrough.

For future access to electrical service, it is possible to locate beneath the flooring layer 21 the dish shaped access cup 18 or the blind flange 19 by geometrical measurements. A portion of the flooring layer 21 immediately above the selected circular opening 17 may be removed to expose the opening 17 for affixation at that time of a suitable electrical floor outlet (not illustrated).

The present invention as applied to cross-over electrical ducts can be readily understood by reference to FIGURES 2 and 3 wherein a pair of outwardly convex dimples 22 are provided diametrically opposed at equal distances from the center of the circular opening 17 in the U-shaped channel 13. An opening 23 for threadedly engaging a fastening screw appears at the center of the dimples 22. The opening 23 may be threaded or may be threadable by means of a self-tapping fastening screw. The access cup 18 is punched from a single sheet of metal and has at its center a circular flat portion 24 which is adapted to engage the circular opening 17. An annular flat plate 25 surrounds the circular flat portion 24 and peripherally terminates into an upwardly flared rim 26. Openings 27 are provided in the annular plate 25 diametrically opposed to each other and corresponding to the dimples 22. A pair of downwardly convex dimples 28 is provided on each side of the openings 27 to serve as spacing means between the annular flat plate 25 and the exposed surface 14 of the duct 11. The dish shaped access cup 18 rests upon the dimples 28 when the circular flat portion 24 is positioned within the opening 17. Fastening screws 29, as previously described, extend through the openings 27 for threaded engagement with the openings 23 in the dimples 22 of the U-shaped channel 13. If desired, slightly longer fastening screws may be employed for securing the dish shaped access cup 18 by providing cylindrical sleeves of suitable length so that the head of the longer fastening screw is close to the upper surface of the flooring layer 21 while the tip of the threaded shaft is maintained out of the generally rectangular cross-section of the cross-over electrical duct 11'.

Desirably a plurality of tongues 30 are punched from the annular plate 25 and upwardly bent. The upwardly bent tongues 30 serve as a retaining means for the flooring layer 21 subsequently poured over the metal flooring.

The prinicipal utility of the dish shaped cover plates 18 is that they provide a ready means for exposing a selected opening 17 when electrical access is desired at a location not theretofore employed. The dish shaped access cups 18 can be located geometrically and, by means of light tapping with a hammer, the flooring layer 21 (illustrated in phantom outline in FIGURE 3) immediately above the dish shaped access cup 18 can be neatly extracted. The rim 26 is positioned only slightly beneath the upper surface of the flooring layer 21, perhaps one-eighth inch. Subsequent withdrawal of the fastening screws 29 permits removal of the access cup 18 without allowing spillage of the superposed portion of the flooring layer 21 into the cross-over electrical duct 11' through the opening 17. Thereafter a suitable electrical outlet fitting (not illustrated) may be assembled above the selected opening 17 to provide the desired electrical access.

Note that the fastening screws 29, as shown in FIGURE 3, are positioned entirely out of the cross-sectional area of the cross-over electrical duct 11' within the volume of the dimple 22.

Referring to FIGURES 2, 3 and 4, the coupling 12 is fabricated in two pieces including a base strap 31 and a cover strap 32. The base strap 31 having a terminal flange 33 at each end, serves to seal the flat plates 15, 15' (see FIGURE 4). The cover strap 32 has terminal flanges 34 and surrounds the juncture between the U-shaped channels 13, 13' (see FIGURE 4). The cover strap terminal flanges 34 have openings through which self-tapping metal screws 35 secure the cover strap 32 to the base strap 31. In order to provide electrical grounding of the cross-over electrical ducts 11, 11', countersunk apertures 36 (see FIGURE 2) are provided in the upper surface of the cover strap 32. These countersunk apertures 36 preferably are provided by means of a punching operation which presents a sharp edge opening, preferably a jagged circular opening, depending downwardly from the upper surface of the cover strap 32. The sharp edge openings 36 are pressed into a metal-to-metal contact with the U-shaped channels 13, 13' when the fastening screws 35 are tightened during assembly of the coupling 12. The upper portion of the cover strap 32 has an arcuate concave lip 37 formed in one edge thereof. The function of the arcuate concave lip 37 will be described later in connection with the blind flange 19.

An important feature of the present invention is illustrated in FIGURE 4. Inspection of FIGURE 4 will reveal that the dimples 28 (only one shown) serve the important function of maintaining the annular plate 25 of the dish shaped access cup 18 spaced from the exposed surface 14' of the cross-over electrical duct 11'. Occasionally one of the circular openings 17 is cut closely adjacent to the end of the cross-over electrical duct 11'. In this instance, a portion of the annular plate 25 and the upwardly flared rim 26 extend beyond the end of the cross-over electrical duct 11'. Since the dimples 28 maintain the annular plate 25 spaced from the exposed surface 14', the cover strap 32 of the coupling 12 may be interposed between the annular plate 25 and the exposed surface 14', as shown, to connect the cross-over electrical ducts 11, 11'. Notice that the function of the dish shaped access cup 18 is not disturbed by the interposed cover strap 32.

Referring to FIGURES 2 and 5, the blind flange 19 comprises a flat sheet of metal adapted to cover the circular opening 17 and is provided with externally convex dimples 38 which are adapted to engage the dimples 22 in the U-shaped channel 13 when the blind flange 19 entirely covers the circular opening 17. Openings 39 are provided at the center of the dimples 38 to receive a fastening screw 29. The fastening screw 29 is slideable in the opening 39 and threadedly engageable in the opening 23. The threaded shaft of the fastening screw 29 is relatively short so that when the fastening screw 29 is tightly threaded into the opening 23, the tip of the fastening screw 29 does not penetrate into the generally rectangular cross-section of the cross-over electrical duct 11. Instead, the threaded shaft of the fastening screw 29 is entirely within the conical volume formed by the inner walls of the dimples 22. The blind flange 19 also has an arcuate convex lip 40 formed in the edge thereof, which is registerable with the arcuate concave lip 37 of the coupling 12.

As hereinbefore stated, the dish shaped access cup 18 has certain advantages over the blind flange 19. For example, by means of light tapping with a hammer, the flooring layer 21 immediately above the dish shaped access cup 18 can be neatly extracted; whereas when the blind flange 19 is used a hammer and a chisel must be used.

Further, the dish shaped access cup 18 serves as a dish for carrying away the broken flooring layer without allowing spillage of the superposed portion of the flooring layer 21 into the cross-over electrical duct 11 through the opening 17; whereas the blind flange being a flat plate has no similar function.

Still further, the rim 26 of the dish shaped access cup 18 serves to automatically limit the size of the opening created in the flooring layer 21 to that size required; whereas the size of the opening must be measured when the blind flange is used.

I claim:

1. An electrical duct having an access cup and adapted for use in combination with cellular flooring, said duct having opposed flat exposed and unexposed horizontal walls and connecting side walls;

said exposed wall having at least one circular wire passageway opening having a rim lying in the plane of said exposed horizontal wall;

a plurality of outwardly raised dimples annularly disposed about said opening and projecting above said exposed wall;

said outwardly raised dimples being formed solely out of material from said flat exposed wall, each of said dimples having at its center a screw-receiving opening;

said access cup covering the said circular opening and secured to said exposed wall in overlying relation therewith;

said access cup being formed from a single sheet of circular material and having a central circular flat portion, a flat annular portion and an upwardly flared rim;

said central circular flat portion extending into the said circular wire passageway opening;

said flat annular portion being offset above said central circular flat portion, but parallel thereto and overlying the said exposed wall adjacent to the said opening;

said upwardly flared rim radiating from said flat annular portion and terminating in a circular rim disposed annularly of and above said flat annular portion;

a plurality of downwardly rounded depressions annularly disposed about said flat annular portion to elevate said flat annular portion above the said exposed wall;

a plurality of screw-receiving apertures in said flat annular portion corresponding to the said screw-receiving openings; and fastening screws extending through said screw apertures and threadedly engaged in the said screw-receiving openings, said fastening screws being positioned within the said dimples entirely above the horizontal plane of the inner surface of said flat exposed wall.

2. An electrical duct having an access cup and adapted for use in combination with cellular flooring, said duct having opposed flat exposed and unexposed horizontal walls and connecting side walls;

said exposed wall having at least one wire passageway opening having a rim lying in the plane of said flat exposed horizontal wall;

a plurality of outwardly raised dimples annularly disposed about said opening and projecting above said exposed wall;

said outwardly raised dimples being formed solely out of material from said flat exposed wall, each of said dimples having at its center a screw-receiving opening;

said access cup covering the said opening and secured to said exposed wall in overlying relation therewith;

said access cup being formed from a single sheet of material and having a central flat portion, a flat annular portion and an upwardly flared rim;

said central flat portion extending into the said wire passageway opening;

said flat annular portion being offset above said central flat portion, but parallel thereto and overlying the said exposed wall adjacent to the said opening;

said upwardly flared rim radiating from said flat annular portion and terminating in a rim disposed annularly of and above said flat annular portion;

a plurality of spacing means annularly disposed between said flat annular portion and said exposed wall to elevate said flat annular portion above the said exposed wall;

a plurality of screw-receiving apertures in said flat annular portion corresponding to the said screw-receiving openings; and fastening screws extending through said screw apertures and threadedly engaged in the said screw-receiving openings, said fastening screws being positioned within the said dimples entirely above the horizontal plane of the inner surface of said flat exposed wall.

References Cited by the Examiner
UNITED STATES PATENTS

| | | |
|---|---|---|
| 1,220,463 | 3/17 | Schnug. |
| 1,411,184 | 3/22 | Rosenberg. |
| 1,945,683 | 2/34 | Fullman. |
| 1,996,371 | 2/35 | Fullman _____ 50—127 |
| 2,097,394 | 10/37 | Fullman _____ 50—127 |
| 2,353,121 | 7/44 | Adam et al. |
| 2,944,478 | 7/60 | Curran. |
| 2,975,559 | 3/61 | Hedgren. |

JACOB L. NACKENOFF, *Primary Examiner.*